United States Patent Office 3,453,269
Patented July 1, 1969

3,453,269
NOVEL CHLORPROMAZINE SALTS
Erik E. Andrup, Holte, and Aase Lundbaek, Lyngby, Denmark, assignors to Novo Terapeutisk Laboratorium A/S, Copenhagen, Denmark, a Danish company
No Drawing. Filed Dec. 29, 1966, Ser. No. 605,573
Claims priority, application Denmark, Jan. 28, 1966, 465
Int. Cl. C07d 93/00; A61k 27/00
U.S. Cl. 260—243                                      2 Claims

ABSTRACT OF THE DISCLOSURE

Novel chlorpromazine salts formed with diphenyl substituted succinic acid are less toxic than, e.g., embonic acid salts and are as active as the hydrochloride salt and are prepared by reacting the substituted succinic acid or a soluble salt thereof with chlorpromazine or a soluble salt thereof.

---

The known chlorpromazine preparations for peroral use consist of sparingly soluble chlorpromazine salts as the active ingredient, particularly embonic acid salts (embonic acid is identical with the compound 2,2'-dihydroxy-1,1'-dinaphthylmethane-3,3'-dicarboxylic acid), and suffer from the disadvantage that the corresponding acids, especially the embonic acid, are relatively toxic.

It has now been found that certain other, novel chlorpromazine salts are far less toxic than the above mentioned sparingly soluble chlorpromazine salts, in particular the embonic acid salt. Furthermore, the biological activity of the novel chlorpromazine salts of the present invention is of the same order as the activity of, e.g., the hydrochloride of chlorpromazine.

The novel chlorpromazine salts of the invention are salts of chlorpromazine with a dicarboxylic acid of the general formula

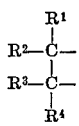

in which two of the groups $R^1$, $R^2$, $R^3$ and $R^4$ stand for phenyl groups, while the two remaining groups stand for hydrogen atoms. An especially preferred chlorpromazine salt within the scope of the above definition is the meso-2,3-diphenyl succinic acid salt of chlorpromazine.

The process of the present invention for preparing salts of chlorpromazine with a dicarboxylic acid of the general formula set forth above comprises reacting a dicarboxylic acid of the above general formula or a readily soluble salt theerof with chlorpromazine or a readily soluble salt thereof.

According to the invention it is especially preferred that the compound meso-2,3-diphenyl succinic acid is employed as the dicarboxylic acid forming a salt with the chlorpromazine, since the said succinic acid derivative has been found to possess a particularly low toxicity.

Furthermore, it is especially advantageous to prepare the chlorpromazine salt by reacting a readily soluble salt of the dicarboxylic acid employed with a readily soluble chlorpromazine salt, stirring being applied to the reaction mixture. A readily soluble chlorpromazine salt is the form of chlorpromazine which is easiest accessible in practice, and by using this embodiment of the process of the invention crystals of such a size are formed that they may be used directly for preparing a chlorpromazine preparation.

It appears from the following table that those dicarboxylic acids which in the present process are reacted with chlorpromazine or a readily soluble salt thereof possess a considerably lower toxicity than the embonic acid.

TABLE I

[$DL_{50}$ (mg. of acid per kg., applied as Na-salt, found by determination of acute toxicity in mice]

|  | Intravenously | Subcutaneously | Perorally |
|---|---|---|---|
| Meso-2,3-diphenyl-succinic acid | 1,700 | 5,200 | 8,400 |
| Embonic acid | 110 | 550 | 2,350 |
| Ratio | About 1:15 | About 1:10 | About 1:4 |

In order to illustrate that the salts prepared by the process of the present invention possess the same biological degree of activity as chlorpromazine hydrochloride reference is made to the following table in which the effect of chlorpromazine-meso-2,3-diphenyl-succinate is compared with the effect of chlorpromazine hydrochloride by applying a fixed dose of each compound to mice and determining the increase in paw temperature after 10, 20, and 30 minutes, respectively:

TABLE II

[Temperature increase in ° C: Average ± standard error]

| Minutes | Chlorpromazine-meso-2,3-diphenyl-succinate | Chlorpromazine hydrochloride | Difference |
|---|---|---|---|
| 10 | 1.7±0.5 | 2.8±0.7 | 1.1 |
|  | Difference not significant (p>0.05) | | |
| 20 | 4.3±0.8 | 4.3±0.7 | 0.0 |
| 30 | 4.8±0.2 | 4.7±0.4 | 0.1 |
|  | Difference not significant (p>0.05) | | |

The process of the invention is further illustrated in the following specific examples.

EXAMPLE I 1.0 g. of meso-2,3-diphenyl succinic acid were dissolved in 10 ml. of water, at the same time adding 7.4 ml. 1 N sodium hydroxide solution. The resulting neutral solution of the disodium salt of meso-2,3-diphenyl succinic acid was added dropwise to a solution of 2.6 g. of chlorpromazine hydrochloride in 20 ml. of water under vigorous stirring. Hereby a suspension was obtained containing crystals of a size of 5 to 6μ, and this suspension could be employed either directly for the preparation of chlorpromazine mixture, or the crystals may be isolated by filtration or centrifugation and again suspended in the liquid used in the mixture. After drying at 100° C. the crystals had a melting point of 160 to 165° C. and contained 69.8 percent of chlorpromazine base. A salt of 1 mole 2,3-diphenyl succinic acid and 2 moles chlorpromazine base contains theoretically 70.2 percent of chlorpromazine base.

EXAMPLE II 1.0 g. of meso-2,3-diphenyl succinic acid, 2.4 g. of chlorpromazine base, 30 ml. acetone and 35 ml. water were mixed and heated to boiling. Hereby all solid matter was dissolved. Upon cooling to 0° C. needle-formed crystals were precipitated. The crystals were separated from the mother liquor by filtration, washed with water on the filter, dried in air at room temperature and further dried at 100° C. in a drying cabinet. The crystals melted between 161 and 164° C. and contained 70.0 percent of chlorpromazine base.

EXAMPLE III 1.0 g. of D,L-2,3-diphenyl succinic acid containing 1 mole of water of hydration and 1.1 g. of chlorpromazine base were dissolved by stirring in 5.0 ml. acetone. 3.0 ml. water were added to the solution and mixed therewith. After standing for 1 hour the precipitated crystals were separated by suction, and the crystals were washed on the filter with water. The crystals were dried in air, first at room temperature, and were then dried at 100° C. in a drying cabinet. The crystals melted between 158 and 162° C., and they contained 53.4 percent chlorpromazine base. A salt formed between 1 mole 2,3-diphenyl succinic acid and 1 mole chlorpromazine base contains theoretically 54.1 percent chlorpromazine base.

EXAMPLE IV 1.0 g. of 2,2-diphenyl succinic acid, 1.4 g. of chlorpromazine base, 14 ml. acetone and 16 ml. water were mixed and heated to boiling. Hereby all solid matter was dissolved. Upon cooling to 0° C. crystals were precipitated. The crystals were separated from the mother liquor by filtration, washed with water and dried at 60° C. The crystals melted between 126 and 129° C. and contained 53.1 percent chlorpromazine base. A salt formed between 1 mole 2,2-diphenyl succinic acid and 1 mole chlorpromazine base contains theoretically 54.1 percent chlorpromazine base.

We claim:
1. A chloropromazine salt of a dicarboxylic acid of the formula

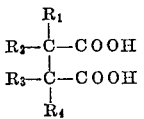

in which two of the groups $R^1$, $R^2$, $R^3$ and $R^4$ stand for phenyl groups, and the two remaining groups stand for hydrogen atoms.

2. Chloropromazine salt of meso-2,3-diphenyl succinic acid.

References Cited

UNITED STATES PATENTS 3,240,779   3/1966   Jacob et al. _____ 260—243

HENRY R. JILES, *Primary Examiner.*

HARRY I. MOATZ, *Assistant Examiner.*

U.S. Cl. X.R.

424—247